Figure 1:
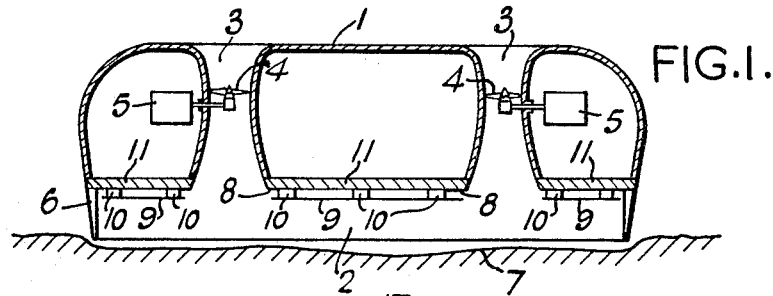

Aug. 9, 1966  E. G. TATTERSALL  3,265,143
VEHICLES FOR TRAVELLING OVER A SURFACE HAVING MEANS FOR
REDUCING LOADS AND VERTICAL ACCELERATIONS RESULTING
FROM SURFACE IRREGULARITIES
Filed Sept. 4, 1963

*INVENTOR*
E. G. TATTERSALL

BY
Cameron, Kerkam + Sutton
*ATTORNEYS*

3,265,143
VEHICLES FOR TRAVELLING OVER A SURFACE HAVING MEANS FOR REDUCING LOADS AND VERTICAL ACCELERATIONS RESULTING FROM SURFACE IRREGULARITIES
Edward Gunston Tattersall, Hythe, England, assignor to Hovercraft Development Limited, London, England, a British company
Filed Sept. 4, 1963, Ser. No. 306,450
Claims priority, application Great Britain, Sept. 5, 1962, 34,026/62
13 Claims. (Cl. 180—7)

This invention relates to vehicles for travelling over a surface and which are supported above that surface by one or more cushions of pressurised gas.

In such vehicles, the cushion or cushions of pressurised gas generally extend for substantially the whole of the plan area of the vehicle and the load on the bottom surface of the vehicle, due to the pressure of the cushion, is spread evenly over the area of the cushion or cushions, the loading being comparatively light with substantially no concentrated loads. Therefore if this load were the only one which needed to be taken into account, the bottom surface of the vehicle could be in the form of a relatively light and simple structure.

However, when the vehicle is travelling over water or uneven ground there is the probability that it will meet waves or irregularities in the surface of the water or ground the height of which will be sufficient for the crests to hit the bottom surface of the vehicle. This is likely to happen irrespective of the means which contain the cushion or cushions of gas at the periphery, for example curtains of moving fluid, skirt members or both, and severe local impact loads will be imposed on the bottom surface of the vehicle together with undesirable vertical accelerations. Further, it is possible for debris such as pieces of wood to be brought into contact with the bottom surface of the vehicle by the waves.

To withstand the local loads it is possible to make the bottom surface much stronger and more complex, but this results in more expensive and heavier construction than would otherwise be the case. Further, even though the construction can withstand the loads applied, these loads are still liable to produce undesirable vertical accelerations on the vehicle. The present invention is concerned with the provision of means for at least reducing the severity of such impact loads and accelerations by positioning a deflectable or deformable member, or a number of such members, beneath the bottom surface of the vehicle, the member or members moving or deforming to reduce the loads and accelerations applied to the main body of the vehicle when meeting obstacles such as waves. According to the invention there is provided a vehicle for travelling over a surface and which is supported above the surface by at least one cushion of pressurised gas formed and contained beneath the vehicle, comprising at least one shock absorbing or shielding member extending over a substantial part of the bottom surface of the main body of the vehicle, said member being flexible and/or flexibly attached to or below the said bottom surface whereby local impact loads and vertical accelerations imposed on the vehicle due to irregularities in the surface can be intercepted by the member and their effect on the vehicle reduced by deflection of the member from its normal location.

In one form of the invention the member may be in the form of a plate, which may be of rigid or flexible construction, supported below the bottom surface of the main body of the vehicle, and spaced from the bottom surface. The spacing of the member from the bottom surface may be such that at no time can the member be deflected by contact with the surface so as to contact the bottom surface of the vehicle. Alternatively, the spacing can be such that the member is not deflected into contact with the bottom surface of the vehicle by waves or other obstacles of a height liable to be encountered during the majority of the operating time of the vehicle, but that contact can occur if waves or other obstacles of an exceptional height are met.

In another form of the invention each member may be in the form of a resilient layer attached directly to the bottom surface of the main body of the vehicle. For example, each member may comprise one or more layers of foamed flexible material. Alternatively, each member can be formed of one or more inflatable bags or the like. Where one or more layers of foamed material are used on vehicles operating over water, the surface presented to the water can be impervious or, alternatively, may be permeable, water passing into the layer or layers when the crest of a wave contacts the layer or layers.

Figure 2:
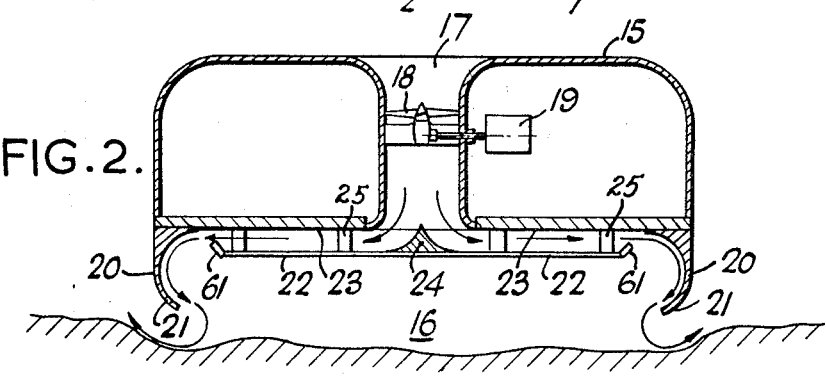
Figure 3:
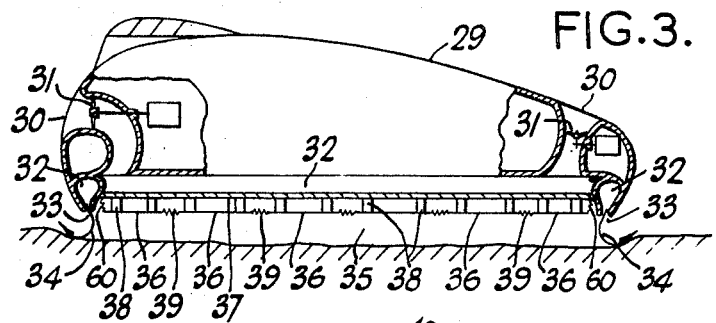
Figure 4:
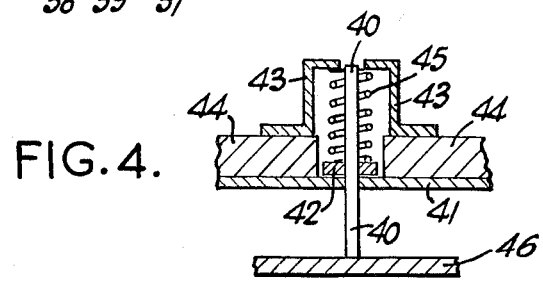

The invention will be readily understood by the following description of certain embodiments in conjunction with the accompanying drawings in which:

FIGURE 1 is a diagrammatic vertical cross-section through one form of vehicle embodying the invention, FIGURE 2 is a diagrammatic vertical cross-section through another form of vehicle embodying the invention, FIGURE 3 is a diagrammatic vertical cross-section parallel to the fore and aft axis of a further form of vehicle embodying the invention, and FIGURE 4 illustrates diagrammatically an alternative method of attaching a member.

In the description of the various embodiments it will be assumed that the cushion is of air although other gases such as exhaust gases and mixtures thereof can be used.

FIGURE 1 illustrates diagrammatically a vehicle 1, a cushion of pressurised air being formed in the space 2 by air drawn in through intakes 3 by propellers 4 driven by engines 5. The space 2 is bounded at its periphery by means of a downwardly projecting skirt member 6, the vehicle being of the so-called "plenum chamber" type. Once the air cushion has been formed, the vehicle is lifted above the surface 7 and excess air escapes between the bottom edge of the member 6 and the surface 7.

Normally, without the application of the present invention, the bottom surface 8 of the vehicle would need to be constructed strong enough to withstand the concentrated local loads imposed by waves and the like hitting the bottom surface during operation. In the embodiment illustrated in FIGURE 1, a series of flexible members 9 are positioned below and substantially parallel to the bottom surface 8 of the vehicle. The members 9 protect or shield the bottom surface 8 against impact loads and thus the bottom surface can be of very light construction, needing only to be strong enough to withstand the load due to the cushion pressure, which is spread evenly over the entire area of the cushion.

The shielding members 9 are flexibly attached to the bottom surface 8 of the vehicle by supports 10 at a plurality of positions distributed over said surface. The supports 10 can be of varying construction, for example in the form of springs or blocks of resilient material or of rigid material but being flexibly attached to a main member 11 of the vehicle. When the supports are in the form of springs, blocks of resilient material or the like, they will normally tend to maintain the members 9 at a predetermined position relative to the bottom of the vehicle. As the members 9 are both flexible and also flexibly attached, they can be of very light construction. As the crests of waves hit the members 9 they can both flex and deflect upwards, reducing the maximum loads imposed by contact between the waves and the members. It is possible for the total weight of the bottom surface 8, the members 9 and the supports 10 to be less than the weight of a normal bottom surface which has to withstand impact loadings, and at the same time undesirable vertical accelerations of the vehicle will be reduced.

FIGURE 2 illustrates an alternative form of vehicle 15, in which a cushion of pressurized air is formed in the space 16 by air drawn in through an intake 17 by a propeller 18 driven by an engine 19. The space 16 is bounded at its periphery by a downwardly projecting skirt member 20. The downwardly projecting member 20 has a lower part 21 which is curved inwards towards the space 16. A shielding member 22 extends horizontally below the bottom surface 23, is flexibly attached thereto by supports 25 and has a deflector 24 positioned beneath the intake 17. The air drawn in by the propeller 18 is deflected by the deflector 24 and flows outwards towards the downwardly projecting member 20, between the member 22 and the bottom surface 23 of the vehicle. The air flows down the inside of the downwardly projecting member 20, being deflected inwards by the lower part 21. The air issues from the bottom edge of the downwardly projecting member in an inwards and downwards direction. The air tends to issue in the form of a curtain and the vehicle is thus somewhat of a combination of a "plenum chamber" vehicle as in FIGURE 1 and of a vehicle in which the cushion is formed and contained by one or more fluid curtains. The vehicle illustrated in FIGURE 2 has a greater clearance from the surface over which it is operating than a more normal form of "plenum chamber" vehicle where the air issues directly into the space occupied by the cushion as in FIGURE 1.

In both of the vehicles illustrated in FIGURES 1 and 2, the downwardly projecting skirt members 6 and 20 can be of flexible construction.

FIGURE 3 illustrates a vehicle 29 in which the air drawn in through the intakes 30 by the propellers 31 is fed to a duct 32 situated in the bottom of the vehicle adjacent to the periphery thereof. Formed in the bottom of the duct 32 is a supply port 33 through which the air issues to form a curtain of moving air 34. A cushion of pressurised air is formed and maintained in the space 35 by the air curtain 34. In this example, a series of small shielding members 36 extend horizontally beneath the bottom surface 37 of the vehicle. Each member is of rigid construction but is flexibly attached to the bottom surface 37 by supports 38 and each member is flexibly attached to adjacent members by flexible sections 39.

As stated above, the supports which attach the shielding members to the vehicle can be of varying construction. In the examples illustrated in FIGURES 1, 2 and 3, the supports have been shown as being attached to the underside of the main member. If springs are used then it will be appreciated that the full distance between the member and the bottom surface of the vehicle will not be available for deflection as the springs will have a minimum closed length beyond which deflection cannot occur. Similar difficulties can arise for other forms of construction.

FIGURE 4 illustrates an arrangement for supporting a shielding member 46 comprising a central sliding rod 40 which passes through a hole in the bottom surface 41. A flange 42 is attached to the rod 40 at a position which is just above the bottom surface 41 when the member 46 is in its normal undeflected position. A casing 43 is attached to a main member 44, the casing enclosing the rod 40. A spring 45 is positioned between the flange 42 on the rod 40 and the top of the casing 43. When the rod moves upwards due to deflection of the member 46, the spring 45 is compressed. The top of the rod 40 passes through a hole in the top of the casing 43. Instead of a spring, other loading means such as a hydraulic cylinder can be used.

When shielding members are provided which are spaced from the bottom surface of the main body of the vehicle, as in FIGURE 1, 2 or 3, the cushion of pressurised air normally extends between the members and the bottom surface as well as between the members and the surface of the land or water. Deflection of the members will cause some of the air between the members and the bottom surface to be forced out and this will create a certain degree of resilience. The cushion can be prevented from extending between the members and the bottom surface of the vehicle by connecting the edges of the members to the bottom surface of the main body of the vehicle by flexible membranes or the like. For example, in FIGURE 3 flexible membranes 60 can be provided between the edges of the members 36 which are adjacent to the periphery of the vehicle and the bottom surface 37. In such an arrangement, the members 36, also carry the cushion pressure and the bottom surface 37 is normally substantially unstressed, but can act as a safety feature in the event that any of the members 36 or the flexible sections 39 are damaged.

The resilience provided by the action of forcing air out from between the members and the bottom surface can be increased as the deflection of a member increases by forming an upturned lip on the periphery of a member. In the example illustrated in FIGURE 2, the member 22 can have a lip formed at its periphery as indicated at 61. The gap between the lip 61 and the bottom surface 23 progressively decreases as the member 22 deflects upwards, creating, in effect, a cushion of pressurised air between the member and the bottom surface which acts as a form of spring tending to push the member down.

Where the space occupied by the cushion of pressurised gas which supports the vehicle is sub-divided, either by structural members or by curtains of moving fluid, or by combinations of these, the shielding members will normally extend between the structural members or curtains.

I claim:

1. A vehicle for travelling over a surface and which in operation is supported above that surface by at least one cushion of pressurised gas formed and contained beneath the normally horizontal bottom surface of the main body of the vehicle, comprising means extending downwardly from said bottom surface for containing said cushion, means for reducing the effect on said bottom surface of local impact loads and vertical accelerations due to irregularities in the surface over which the vehicle is travelling including at least one bottom surface shielding member extending substantially parallel to said bottom surface over a substantial part of the area thereof, and means for supporting said shielding member below and spaced from said bottom surface in a normally horizontal position, said support means including a plurality of substantially vertically extending members distributed at spaced points over said bottom surface and extending between said bottom surface and said shielding member, and at least one of said shielding member and said support means being flexible, whereby said shielding member is movable relative to said bottom surface and said cushion containing means so that local impact loads and vertical accelerations imposed on the vehicle due to irregularities in the surface can be intercepted by said shielding member, and their effect on the vehicle reduced by deflection of said member from its normal location.

2. A vehicle as claimed in claim 1 including means for causing a fluid to issue from the lower part of the vehicle to form at least one curtain of moving fluid flowing towards said surface, said curtain forming at least part of said cushion containing means.

3. A vehicle for travelling over a surface and which in operation is supported above that surface by at least one cushion of pressurised gas formed and contained beneath the normally horizontal bottom surface of the main body of the vehicle, comprising means extending downwardly from said bottom surface for containing said cushion, means for reducing the effect on said bottom surface of local impact loads and vertical accelerations due to irregularities in the surface over which the vehicle is travelling including at least one bottom shielding member extending substantially parallel to said bottom surface over a substantial part of the area thereof, and means for supporting said shielding member below and spaced from said bottom surface in a normally horizontal position, said support means including a plurality of substantially vertically extending flexible members distributed at spaced points over said bottom surface and extending between said surface and said shielding member, said support members tending to yieldably maintain the shielding member at a predetermined spacing relative to the bottom surface of the vehicle, whereby said shielding member is movable relative to said bottom surface and said cushion containing means so that local impacts and vertical accelerations imposed on the vehicle due to irregularities in the surface over which the vehicle is travelling can be intercepted by said shielding member, and their effect on the vehicle reduced by deflection of said member from its normal location.

4. A vehicle as claimed in claim 3 wherein said shielding member comprises a plurality of rigid sections extending side by side below the bottom of the vehicle, the adjacent edges of at least some of said rigid sections being connected by flexible sections.

5. A vehicle as claimed in claim 3 including flexible means connecting the edges of said shielding member to the bottom surface of the main body of the vehicle.

6. A vehicle as claimed in claim 3 wherein the cushion of pressurised gas extends into the space between said shielding member and the bottom surface of the vehicle.

7. A vehicle as claimed in claim 5 wherein said shielding member and said flexible means cooperate with said bottom surface to form a closed space normally having no communication with said cushion of pressurised gas.

8. A vehicle for travelling over a surface and which in operation is supported above that surface by at least one cushion of pressurised gas formed and contained beneath the bottom surface of the vehicle, comprising means extending downwardly from said bottom surface for containing said cushion, bottom surface shielding means spaced from and extending substantially parallel to said bottom surface over a substantial part of the area thereof, and a plurality of flexible support members for said shielding means distributed at spaced points over said bottom surface and extending in directions substantially normal to said bottom surface, said flexible support members normally maintaining said shielding means in a substantially horizontal position below said bottom surface while permitting vertical deflection of said shielding means relative to said bottom surface and said cushion containing means, whereby local impact loads and vertical accelerations imposed on the vehicle due to irregularities in the surface over which the vehicle is travelling can be intercepted by said shielding means, and their effect on the vehicle reduced by the deflection of said shielding means from its normal location.

9. A vehicle as claimed in claim 8 including means for supplying pressurised gas to the space between said shielding means and said bottom surface, and means cooperating with said shielding means and said bottom surface for causing said gas to form a curtain of moving gas flowing towards the surface over which the vehicle is travelling, said curtain forming at least part of said cushion containing means.

10. A vehicle for travelling over a surface and which in operation is supported above that surface by at least one cushion of pressurised gas formed and contained beneath the normally horizontal bottom surface of the vehicle, comprising a bottom surface shielding member spaced below and extending substantially parallel to said bottom surface over a substantial part of the area thereof, a plurality of substantially vertically extending flexible support members for said shielding member distributed at spaced points over said bottom surface and extending between said bottom surface and said shielding member, said flexible support members normally maintaining said shielding member in a substantially horizontal position below said bottom surface while permitting vertical deflection of said shielding means relative to said bottom surface, whereby local impact loads and vertical accelerations imposed on the vehicle due to irregularities in the surface over which the vehicle is travelling can be intercepted by said shielding member, and their effect on the vehicle reduced by the deflection of said member from its normal location, means including an intake for supplying pressurised gas to the central portion of the space between said shielding member and said bottom surface whence the air flows outwards through said space towards the periphery of said bottom surface, and a skirt member projecting downwards from said bottom surface adjacent the periphery of said shielding member and having a portion extending below said shielding member which is curved inwards towards the space wherein said cushion of pressurised gas is contained, said skirt member forming the upper part of the boundary of said cushion and causing the gas which flows outwards between said shielding member and said bottom surface to flow down the inside of said skirt member and to issue from the bottom edge thereof in the form of a curtain of moving gas flowing towards the surface over which the vehicle is travelling, said curtain forming the lower part of the boundary of said cushion of pressurised gas.

11. A vehicle as claimed in claim 10 wherein said downwardly depending skirt member is of flexible construction.

12. A vehicle as claimed in claim 10 including an upturned lip on the periphery of said shielding member which restricts the flow of gas outwards from the space between said shielding member and said bottom surface of the vehicle.

13. A vehicle as claimed in claim 10 including an upwardly extending deflector mounted on said shielding member beneath the intake through which said pressurised gas is supplied for deflecting said gas outwards through the space between said shielding member and said bottom surface.

References Cited by the Examiner

UNITED STATES PATENTS

| | | | |
|---|---|---|---|
| 3,016,864 | 1/1962 | Woodfield | 114—61 |
| 3,042,129 | 7/1962 | Wade | 180—7 |
| 3,137,262 | 6/1964 | Tibbetts et al. | 114—67 |
| 3,139,947 | 7/1964 | Beardsley | 180—7 |
| 3,185,240 | 5/1965 | Eggington et al. | 180—7 |

BENJAMIN HERSH, *Primary Examiner.*

M. S. SALES, *Assistant Examiner.*